(12) United States Patent
Miller et al.

(10) Patent No.: US 9,489,542 B2
(45) Date of Patent: Nov. 8, 2016

(54) SPLIT-KEY ARRANGEMENT IN A MULTI-DEVICE STORAGE ENCLOSURE

(71) Applicant: Seagate Technology LLC, Cupertino, CA (US)

(72) Inventors: Mike Miller, Eden Prairie, MN (US); Manuel A. Offenberg, San Francisco, CA (US); Sumanth Jannyavula Venkata, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 183 days.

(21) Appl. No.: 14/539,683

(22) Filed: Nov. 12, 2014

(65) Prior Publication Data

US 2016/0132699 A1    May 12, 2016

(51) Int. Cl.
G06F 21/80 (2013.01)
G06F 21/72 (2013.01)
H04L 9/08 (2006.01)

(52) U.S. Cl.
CPC .............. G06F 21/80 (2013.01); G06F 21/72 (2013.01); H04L 9/0897 (2013.01)

(58) Field of Classification Search
CPC ....... G06F 21/80; G06F 21/72; H04L 9/0897
See application file for complete search history.

(56) References Cited

U.S. PATENT DOCUMENTS

| | | | |
|---|---|---|---|
| 4,982,430 A | 1/1991 | Frezza et al. | |
| 5,544,246 A | 8/1996 | Mandelbaum et al. | |
| 5,835,601 A | 11/1998 | Shimbo et al. | |
| 5,991,876 A | 11/1999 | Johnson et al. | |
| 6,118,874 A * | 9/2000 | Okamoto | H04L 9/0894 380/282 |
| 6,185,678 B1 | 2/2001 | Arbaugh et al. | |
| 6,263,431 B1 | 7/2001 | Lovelace et al. | |
| 6,424,717 B1 | 7/2002 | Pinder et al. | |
| 7,003,621 B2 | 2/2006 | Koren et al. | |
| 7,313,690 B2 | 12/2007 | Miller | |
| 7,599,496 B2 | 10/2009 | Hengeveld et al. | |
| 8,254,568 B2 | 8/2012 | Smith et al. | |
| 8,291,226 B2 | 10/2012 | Chun et al. | |
| 8,438,647 B2 | 5/2013 | Jevans | |
| 8,538,029 B2 * | 9/2013 | Li | H04L 9/085 380/279 |
| 9,071,589 B1 * | 6/2015 | Patnala | H04L 9/0822 |
| 2005/0220305 A1 * | 10/2005 | Fujimoto | G06F 21/606 380/255 |
| 2007/0030058 A1 | 2/2007 | Bel | |
| 2007/0223706 A1 * | 9/2007 | Gantman | G06F 21/34 380/286 |
| 2010/0121821 A1 | 5/2010 | Kinoshita et al. | |
| 2010/0153703 A1 * | 6/2010 | Dodgson | G06F 21/805 713/153 |
| 2010/0172501 A1 | 7/2010 | Tian et al. | |
| 2010/0325363 A1 | 12/2010 | Olesen et al. | |
| 2011/0138475 A1 * | 6/2011 | Gordon | H04L 9/085 726/26 |
| 2012/0131335 A1 | 5/2012 | Bailey et al. | |
| 2012/0221866 A1 | 8/2012 | Flynn | |
| 2013/0232122 A1 | 9/2013 | Fitzgerald et al. | |
| 2013/0326114 A1 | 12/2013 | Goss et al. | |
| 2014/0365743 A1 * | 12/2014 | Pronozuk | G06F 3/0623 711/166 |

* cited by examiner

Primary Examiner — Chau Le (74) Attorney, Agent, or Firm — Hall Estill Attorneys at Law (57) ABSTRACT

Apparatus and method for data security in a multi-device data storage enclosure. In some embodiments, the storage enclosure has a housing with opposing first and second ends. A plurality of active elements are disposed within the housing including an array of data storage devices, a control board, and an interconnection arrangement which mechanically and electrically interconnects the plurality of storage devices with the control board. A control circuit encrypts user data stored on a selected data storage device using a cryptographic encryption function and an associated cryptographic key. The key is partitioned into a plurality of portions, with each portion stored in a different one of the active elements.

20 Claims, 5 Drawing Sheets

SPLIT-KEY ARRANGEMENT IN A MULTI-DEVICE STORAGE ENCLOSURE

SUMMARY

Various embodiments of the present disclosure are generally directed to an apparatus and method for data security in a multi-device data storage enclosure environment.

In some embodiments, a storage enclosure has a housing with opposing first and second ends. A plurality of active elements are disposed within the housing including an array of data storage devices located proximate the first end, a control board located proximate the second end, and a midplane located in a medial portion of the housing which mechanically and electrically interconnects the plurality of storage devices with the control board. A control circuit encrypts user data stored on a selected data storage device using a cryptographic encryption function and an associated cryptographic key. The key is partitioned into a plurality of portions, with each portion stored in a different one of the active elements.

In other embodiments, a method includes providing a multi-device storage enclosure with a housing having opposing first and second ends. A plurality of active elements are disposed within the housing. The active elements include an array of data storage devices located proximate the first end, a control board located proximate the second end, and a midplane located in a medial portion of the housing which mechanically and electrically interconnects the plurality of storage devices with the control board. A cryptographic encryption function using an associated cryptographic key is applied to encrypt user data stored on a selected data storage device of the array. The cryptographic key is partitioned into a plurality of portions, and each portion is stored in a different one of the active elements.

In further embodiments, a method includes receiving a data transfer command to transfer data between a data storage device and a host. The data storage device is located in a multi-device data storage enclosure comprising an array of said data storage devices connected to a midplane and a control board which communicates with the array of data storage devices through said midplane. A cryptographic key is assembled by combining a plurality of portions thereof stored in different memory locations within the multi-device data storage enclosure, with at least a first portion being stored in the array of said data storage devices and at least a second portion being stored in the control board. A cryptographic function is thereafter applied to the transfer data using the assembled cryptographic key.

DETAILED DESCRIPTION

The present disclosure generally relates to data security in a multi-device storage enclosure environment.

Data security schemes are used to reduce or eliminate unwanted access to data by unauthorized users of digital data storage systems. Data security schemes can employ a variety of security techniques, such as but not limited to data encryption, authorization codes, password systems, etc.

Data encryption generally involves the transformation of an input data sequence ("plaintext") to an encrypted output data sequence ("ciphertext") using a selected cryptographic function ("encryption algorithm" or "cipher"). The cipher may utilize one or more pieces of auxiliary data ("keys") to effect the transformation. In this context, plaintext can include data that have been previously encrypted by an upstream encryption process.

Keyed message digest values are a form of authorization codes that can be used to ensure that a given set of data has not been altered by an attacker or process. Keyed message digest values can take a variety of forms, such as but not limited to keyed-hash message authentication codes (HMACs), etc. Generally, a keyed message digest value is a code word that provides indications of tampering with (e.g., changes to) an associated data set. In some cases, a hash can be applied to a set of data (whether plaintext or ciphertext) to generate a keyed-digest value (e.g., an HMAC, etc.), and both the data and the digest value can be stored to a memory. During an authentication operation, the data can be retrieved and used to generate a new digest value that is compared to the original digest value. If the two digest values match, it can be determined that no changes to the data have been made and the data can be safely used.

Passwords are often expressed as a multi-character value that is manually input by a user of the system to gain access to data and/or control functions. Prompts may be displayed on a graphical display, such as a computer monitor, and a keyboard or other input device may be accessed to enter the password. More automated "password" based systems may use biometric modules (e.g., fingerprints, retinal scans, etc.), tokens, magnetic cards, etc. to provide a similar input to access the system.

In secure storage systems, data security schemes are typically enforced at the storage device level in a variety of ways. For example, data may be encrypted at the storage device level and authentication efforts using passwords and/or keyed message digest values can be used between the storage device and a host to identify and authenticate a data exchange. While operable, it has been found by the inventors that these and other device based security systems are vulnerable to attack through the removal of the storage device from the system. That is, an attacking party may physically take the storage device to a secondary location such as a laboratory and employ a range of efforts from brute force to highly sophisticated techniques over an extended period of time to defeat the protection (e.g., "crack" the password or encryption, decode and spoof the HMAC authentication system, etc.).

Multi-device storage enclosures are particularly susceptible to such attacks. Such enclosures are often incorporated into larger mass storage systems which provide large scale storage capabilities in a distributed computing environment (e.g., cloud based object storage systems, RAID storage systems, large database processing systems, etc.).

A multi-device storage enclosure is often a rack-mounted "box" which houses a number of different types of active elements, including an array of individual data storage devices (hard disc drives, solid state drives, hybrid drives, etc.). The data storage devices connect through an interconnection arrangement to one or more control boards within the storage enclosure housing to provide an overall memory space. The control boards may support various forms of functionality such as servers, routers, switches, controllers to enable the storage enclosure to communicate with other local storage enclosures in the same rack as well as remote devices (host devices, proxy servers, remote storage enclosures) in other geographic locations. The storage enclosure may house other active elements as well such as electrical fans, power supplies, boot devices, etc.

Storage enclosures are often designed around a service model that assumes failure of the individual active elements on a relatively regular basis. Replacement modules such as spare storage devices, control boards, power supplies, etc. are often kept on hand and installed upon the detected failure of the various active elements. While not necessarily limiting, it is contemplated that storage devices may be removed and replaced through the front ("cold aisle") side of the storage enclosure housing by selected extension and retraction of supporting sleds, and other active elements such as control boards may be removed and replaced by opening a plate or other member that covers the rear ("warm aisle") side of the storage enclosure housing.

The ability to remove and replace active elements can present a steady stream of "used" storage devices for misappropriation by an unscrupulous party who may, as described above, take possession of the devices and attempt to access data stored thereon. Indeed, the fact that multi-device storage enclosures are often specifically designed to permit the removal and replacement of storage devices in a relatively fast and efficient manner leaves the system open to attack should an unscrupulous party remove one or more such devices in an effort to access data in an unauthorized manner.

Accordingly, various embodiments of the present disclosure are generally directed to a method and apparatus for data security that address these and other limitations of the art. As explained below, various embodiments provide a multi-device storage enclosure environment in which multiple data storage devices are housed within a storage enclosure housing. Other active elements within the storage enclosure housing may include an interconnection arrangement, one or more control boards, one or more secondary boards, boot devices, etc.

Data stored to at least one of the data storage devices are protected using a data encryption scheme in which at least one cryptographic key is used to encrypt the data. The key is divided into at least two portions, with a first portion of the key being stored on the data storage device and a second portion stored in one of the other active elements of the storage enclosure. During data access operations, the first and second portions are combined to provide an overall key that is thereafter used for encryption/decryption efforts of the user data storage on the data storage device.

In some embodiments, the data storage device transfers the first portion of the key to a control board within the storage enclosure which internally reconstitutes the overall key and provides encrypted data to the storage device for storage. This provides a "remote" encryption operation outside of the data storage device. The data storage device may apply additional encryption operations upon the received data as required.

In other embodiments, the control board transfers the second portion of the key to the storage device which internally reconstitutes the overall key and performs "local" encryption operations within the data storage device. As before, the storage device may apply additional levels of encryption or other data security operations as well.

In this way, the data storage device is only generally operable to retrieve decrypted data so long as the data storage device remains operationally installed in the intended use environment. Removal of the data storage device and transport thereof to a secondary location means that only a portion of the required encryption mechanism is present within the storage device, leading to enhanced protection of the data stored on the device.

Figure 1:
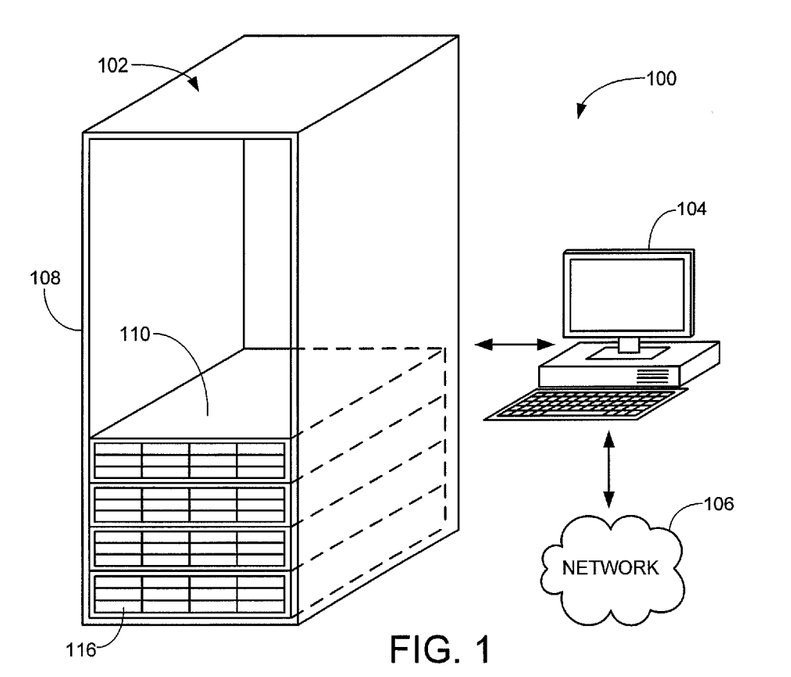
FIG. 1 is a functional representation of a networked mass storage system to illustrate a suitable operational environment for various embodiments of the present disclosure.

These and other aspects of various embodiments will now be understood beginning with a review of FIG. 1 which shows a portion of a networked mass storage system 100. The system 100 includes a storage assembly 102 coupled to a computer 104, which in turn is connected to a network 106. The separate computer 104 is unnecessary, but if employed can take a variety of forms such as a work station, a local personal computer, a server, etc. The storage assembly 102 includes a server cabinet (rack) 108 and a plurality of modular storage enclosures 110.

In some embodiments, the storage rack 108 is a 42U server cabinet with 42 units (U) of storage, with each unit comprising about 1.75 inches (in) of height. The width and length dimensions of the cabinet can vary but common values may be on the order of about 24 in.×36 in. Other sizes can be used. Each storage enclosure can be a multiple of the storage units, such as 2U, 3U, 5U, etc. Fully populating the rack 108 with storage enclosures 110 can provide several Petabytes ($10^{15}$ bytes) of storage or more for the computer 104 and/or network applications.

Figure 2:
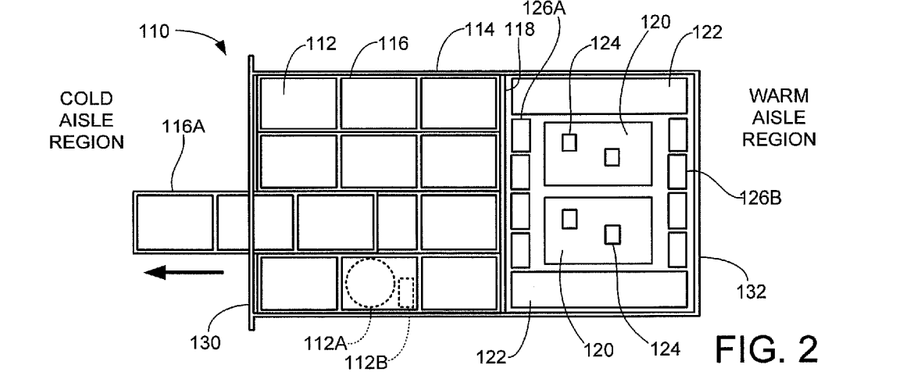
FIG. 2 is a top plan representation of a storage enclosure from FIG. 1.

An example configuration for a selected storage enclosure 110 is shown in FIG. 2. The storage enclosure 110 takes a 36/2U configuration with 36 (3×4×3) data storage devices 112 in a 2U form factor height storage enclosure housing 114. A variety of other configurations can be used including storage enclosures with a total of N drives where N=12, 16, 20, 24, 30, 32, 48, etc. Other heights can be used as well, such as 3U, 4U, 5U, etc. While 1U height storage enclosures are contemplated, it has been found in some cases that a thicker enclosure housing (e.g., 2U or greater) provides improved structural stability and vibration response.

The storage devices 112 can take a variety of forms, such as hard disc drives (HDDs), solid-state drives (SSDs), hybrid drives, etc. Each storage device 112 includes a controller and computer memory to provide storage of user data, such as represented by rotatable disc memory 112A and controller 112B. In a cloud computing environment, data may be stored in the form of objects (partitions) of selected size and duplicated a number of times in different zones in different storage devices. It is contemplated that the storage devices 112 in FIG. 2 are 3.5 inch (in.) form factor HDDs with nominal length and width dimensions of 5.75 in.×4.0 in. Other styles and form factors of storage devices can be used, including but not limited to 2.5 in. form factor devices with nominal dimensions of 4.0 in.×2.88 in.

Retractable sleds 116 are used to secure multiple sets of the storage devices 112. The sleds can be individually extended and retracted from the housing 114, as shown for a selected sled 116A which has been partially extended from the housing 110. The sleds 116 may include sled electronics (not separately shown) to provide status indications and other control features during enclosure operation. While the sleds 116 are shown to support the storage devices 112 in a horizontal orientation (e.g., the length and width dimensions of the storage devices are parallel to the overall length and width dimensions of the storage enclosure housing 114), the sleds 116 can alternatively support the storage devices 112 in a vertical orientation (e.g., "on edge" so that the length and width dimensions of the storage devices are orthogonal to the length and width dimensions of the storage enclosure).

In some cases, the sled 116 constitutes the lowest level of field replaceable unit (FRU) with regard to the storage devices 112. That is, upon a failure of at least one of the storage devices 112 in a selected sled 116, the entire sled is removed and replaced with a new, replacement sled. All of the storage devices in the failed sled may be discarded or the "failed" storage device(s) may be discarded and the "good" storage device(s) may be set aside for incorporation into a new sled for future deployment. Alternatively, individual storage devices 112 may be the lowest level of FRUs so that individually failed devices are removed from the sleds 116 and new replacement storage devices are installed. Regardless, it will be noted that user data are stored on each of the removed storage devices, leaving open a potential attack point for unauthorized access to the system data stored thereon.

A midplane 118 extends in a transverse direction across the housing 114 to provide electrical interconnection paths for the various storage devices 112 and sled electronics. The midplane may take the form of a fixed multi-layer printed circuit board assembly (PCBA) with various electrical connectors, signal traces and vias to establish the necessary electrically conductive signal and power paths.

Alternatively, the midplane may take a flexible configuration in which flex circuits (e.g., cables, etc.) are used to maintain electrical interconnection with, and hence continued operation of, the storage devices and sleds even when the sleds are extended (e.g., "hot swapping"). When a rigid midplane is used, extension of a sled (e.g., sled 116A) will generally result in the associated storage devices on the extended sled being powered down and disconnected from the system (e.g., "cold swapping"). It will be appreciated that the midplane 118 forms an interconnection arrangement that mechanically and electrically interconnects the various data storage devices. While a transverse midplane is shown, other interconnection arrangements can be used including side planes, cabling, flexures, etc. all of which will be understood as different variants of "midplanes" for purposes of the present disclosure since the midplanes are functionally disposed between the various data storage devices and other active elements of the system.

Other active elements in the storage enclosure 110 of FIG. 2 include dual redundant control boards 120. The control boards 120 can take a variety of forms depending on the configuration of the storage enclosure 110, such as a server, a network switch, a router, a RAID controller, etc. The multiple control boards can be used in a dual mode operation to support failover and failback operations, or as a master/slave arrangement so that one control board provides control operations and the other board operates in a standby mode ready to take over operation should a fault be detected in the main control board.

Dual redundant power supplies are represented at 122. The power supplies 122 provide electrical power for the control boards 120 and other active elements of the storage enclosure 110 such as the storage devices 112. The electrical power is supplied at suitable voltage levels (e.g., 3V, 5V, 12V, etc.). Redundancy is provided such that each power supply 122 is rated to supply power for the entire enclosure, should the remaining power supply or supplies be temporarily taken off line.

The control boards 120 include one or more integrated circuit (IC) devices 124. The IC devices 124 can generate significant amounts of heat during operation, requiring the use of active cooling to maintain the devices in a suitable temperature range. Similarly, the storage devices 112 can generate significant amounts of heat during operation depending upon system loading.

Accordingly, the storage enclosure 110 of FIG. 2 further incorporates a number of electrical fans. Forward located fans 126A are provisioned near the midplane 118 at an intermediate location within the storage enclosure housing 114, and rearward located fans 126B are provisioned at the rear of the storage enclosure housing 114. The respective fans may be nominally identical or may be provided with different operational characteristics. The fans draw cooling airflow from a cold aisle region adjacent the front of the cabinet 108 (see FIG. 1), through the enclosure housing 114, and out to a warm aisle region adjacent the rear of the cabinet.

Figure 3:
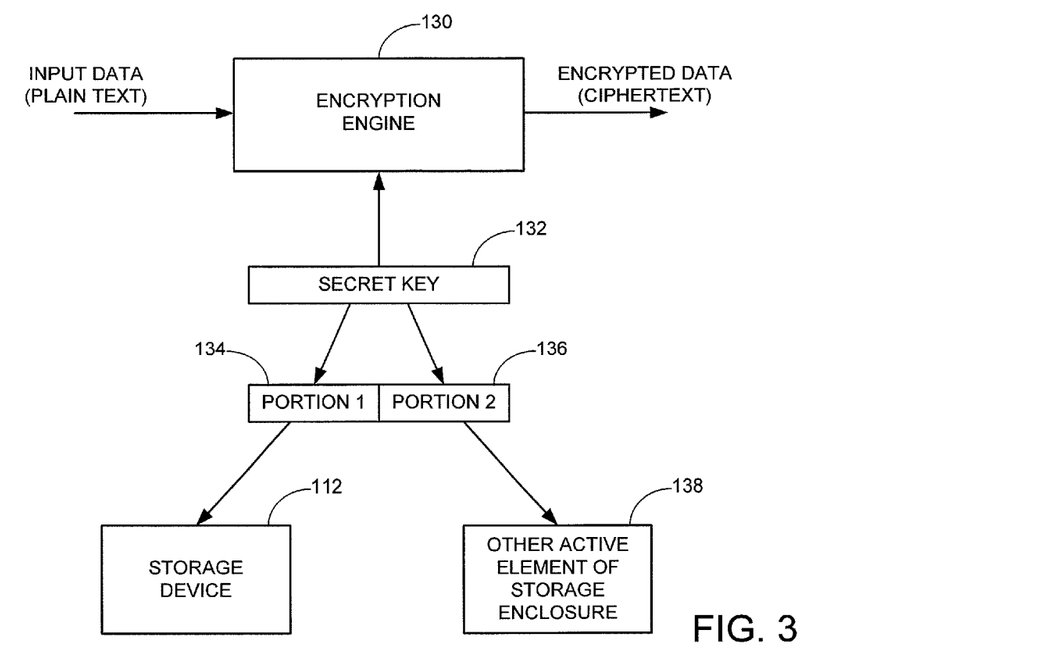
FIG. 3 is a functional block representation of aspects of the storage enclosure of FIG. 2 in accordance with various embodiments.

FIG. 3 depicts an encryption engine 130 used during data access (e.g., read and write) operations with the storage enclosure 110 of FIG. 2 as part of a data security scheme implemented in accordance with various embodiments. The encryption engine 130 can be located in any suitable location with the storage enclosure, such as within each of the data storage devices 112, in each of the control boards 120, in an active component mounted to or adjacent the midplane 118, etc. Generally, the encryption engine 130 operates to receive input data, which may be in the form of plaintext or ciphertext, and to transform the input data using a suitable cipher algorithm to generate encrypted output data (ciphertext).

The cipher algorithm uses at least one key 132 as an input to control the data transformation. Any number of encryption (cipher) algorithms can be used without limitation. In most cases, symmetric encryption algorithms are employed in conjunction with a confidentiality mode such as cipher block chaining (CBC), XTS (XOR/encrypt/XOR), counter (CTR), etc. In addition to the key 132, the encryption can involve tweak values, seed values, counter values, initialization vectors, etc. as required.

As shown by FIG. 3, the key 132 is divided into multiple portions. Only two (2) such portions are depicted in FIG. 3, but it will be understood that any plural number N portions can be used. A first portion 134 is denoted as "portion 1," and a second portion 136 is denoted as "portion 2." The two portions may be of equal length or may be of different respective lengths.

The first portion 134 is stored in a selected data storage device 112, and the second portion 136 is securely stored in a generic "other" active element 138 of the storage enclosure 110. The other active element 138 may correspond to any of the other elements in the storage enclosure. In some embodiments, the other active element 138 is one (or both) of the redundant control boards 120. In other embodiments, the other active element 138 is the midplane 118, a separate, secondary control board (not separately shown), a separate boot device of the enclosure (not separately shown), one of the other storage devices 112 in the enclosure, etc. In further embodiments, portions of the key 132 are securely distributed to each of these elements.

While not necessarily limiting, it is contemplated that at least a portion of the key will be stored in an element of the storage enclosure 110 that is not easily removed from the storage enclosure without significant disruption to the continued operation of the storage enclosure, either or both from a physical mechanical operation (e.g., gaining physical access to the interior of the storage enclosure housing 112) or from an electrical (e.g., system software) standpoint (e.g., without requiring the entire enclosure to be taken offline and powered down, which would be readily detected by system monitoring functions). A secure channel can be used by which these respective portions (key splits) can be distributed to the various active elements.

At this point it should be understood that the schematic diagram of FIG. 3 is representational in nature to provide an understanding of the overall process, and a number of variations are envisioned by the diagram. In some embodiments, the secret key 132 is physically divided into two halves, so that, for example, a 256 bit key may be divided into the first 128 bits to form the first portion 134 and the second 128 bits form the second portion 136. In this case, the first and second portions 134, 136 can be used to reconstruct the secret key 132 by combining the respective portions together.

In other embodiments, the first and second portions 134, 136 constitute authentication keys and the secret key 132 is a media encryption key (or some other key that in turn encrypts/decrypts a media encryption key). The authentication keys may wrap the secret key 132 so that, for example, both of the authentication keys are required for a decryption process to decrypt the secret key 132. In this case, the first and second portions 134, 136 can be used to reconstruct the secret key 132 by presenting both to a selected decryption algorithm or similar cryptographic function.

In still other embodiments, secret sharing techniques are used so that the first and second portions 134, 136 constitute shares that have been generated to enable reconstruction of the secret key 132. Additional shares (portions) may be distributed through the system, as discussed below. As will be recognized, secret sharing techniques are employed to distribute a secret (e.g., the secret key 132). In some cases, an (N, M) secret sharing algorithm is selected such that the secret is divided into N shares, where at least M (where M≤N) shares are required to fully reconstitute the secret and M−1 shares are insufficient to do so. In this way, removal of the storage device from the enclosure will generally only provide a single share, which depending on the secret sharing algorithm will be insufficient to reconstitute the secret away from its normal location.

Other ways to generate, distribute and use the various portions (also referred to herein as "key splits") are contemplated and will be readily apparent to the skilled artisan in view of the present disclosure. For clarity, each of these foregoing approaches will be generally referred to as the partitioning of the secret key 132 into multiple portions such as 134, 136 regardless whether the secret key is physically divided into segments, protected (wrapped) by authentication keys as the respective portions, protected by shares as the respective portions in a secret sharing scheme, etc.

Figure 4:
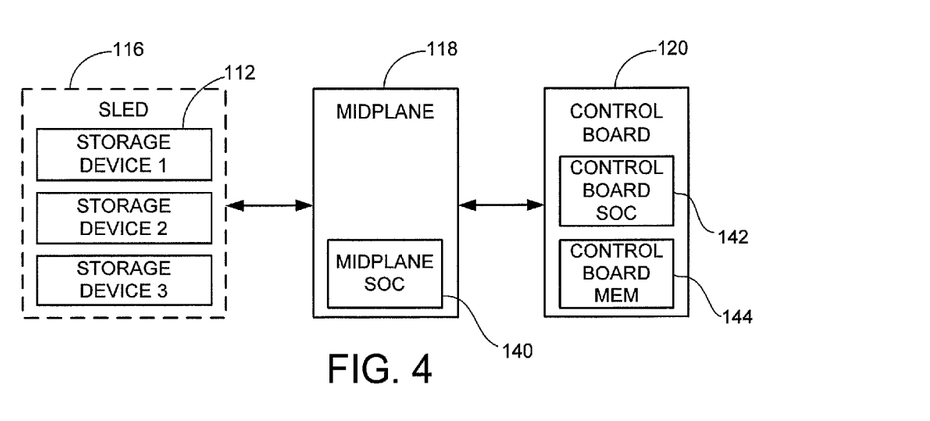
FIG. 4 is another functional block representation of aspects of the storage enclosure of FIG. 2.

FIG. 4 is another functional block representation of aspects of the storage enclosure 110 of FIG. 2 in some embodiments. A selected one of the sleds 116 houses three storage devices 112 denoted as storage devices 1-3. The midplane 118 includes a midplane system on chip (SOC) device 140 that can be configured to store the second portion 136 of the key 132. The control board 120 includes both a control board SOC device 142 and control board memory 144. These devices 142, 144 may correspond to the IC devices 124 shown in FIG. 2, and can be alternatively configured to store the second portion 136 of the key 132.

Figure 5:
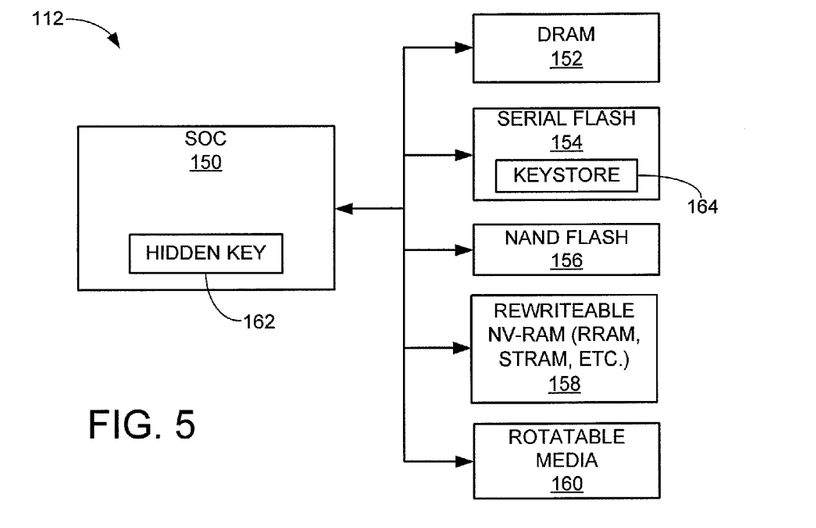
FIG. 5 is a functional block representation of a selected storage device of the enclosure.

FIG. 5 is a functional block representation of the storage device 112 of FIG. 4 in some embodiments. The storage device 112 includes a system on chip (SOC) device 150 operably connected to a number of different memory modules, including a volatile dynamic random access memory (DRAM) 152, a non-volatile NOR serial flash memory 154, a non-volatile NAND flash memory 156, a rewriteable non-volatile random access memory (NV-RAM) memory 158 and rotatable media 160. For reference, the various memory modules can be collectively characterized as a single "memory." The NV-RAM memory 158 can take a variety of forms such as rewriteable spin-torque transfer random access memory (STRAM), resistive random access memory (RRAM), etc. The rotatable memory 160 can be optical, magnetic, etc.

The various memory modules are illustrative of different types of memory modules that can be coupled to the SOC 150, and not all of the memory modules shown in FIG. 2 may be present in a given embodiment. For example, a hard disc drive (HDD) embodiment may use rotatable media 160 in the form of optical or magnetic recording media as a main memory store and omit the NAND flash memory 156 and the NV-RAM memory 158. A solid-state drive (SSD) embodiment may omit the rotatable media 160 and use the NAND flash memory 156 and/or the NV-RAM memory 158 as the main memory store. A hybrid embodiment may utilize each of the memories shown in FIG. 5. Other memory modules can be incorporated as well.

The SOC 150 provides controller functionality for the data storage device 112. To this end, the SOC 150 includes an internal memory location 162 to which is stored the first portion 134 of the cryptographic key 132 (see FIG. 3) as a secret key. The internal memory location 162 may be formed of one-time programmable (OTP) fusible links, or may take some other form. The secret key (e.g. first portion 134) can be any suitable length and is generally not accessible in a plaintext format outside the SOC 150. The SOC 150 has other internal functionality as well, such as the encryption engine functionality discussed above in FIG. 3.

An encrypted keystore data structure ("keystore") may be stored in the serial NOR flash 154 or some other suitable memory location. The keystore is an encrypted ciphertext string generated to protect the hidden key in memory 162. The encrypted keystore data structure can be stored in one or more suitable memory locations throughout the system. The example shown in FIG. 2 stores the keystore data structure at a selected (address) 164 of the serial flash memory 154. In some cases, the serial flash memory is a 64 KB NOR flash memory with 16 slots (e.g., rows or blocks) of 4 KB each, and the keystore data structure is written to a selected one of the available 4 KB slots. However, other memory locations for the keystore data structure are readily contemplated including one or more of the other non-volatile memory modules (e.g., the NAND flash memory 156, the rotatable media 160, etc). In still other embodiments, the keystore is stored internally within the SOC 150 in a suitable programmable memory location such as a block of rewriteable STRAM memory. A backup copy of the keystore data structure can be stored in the serial flash memory 164 or elsewhere.

Figures 6, 7:
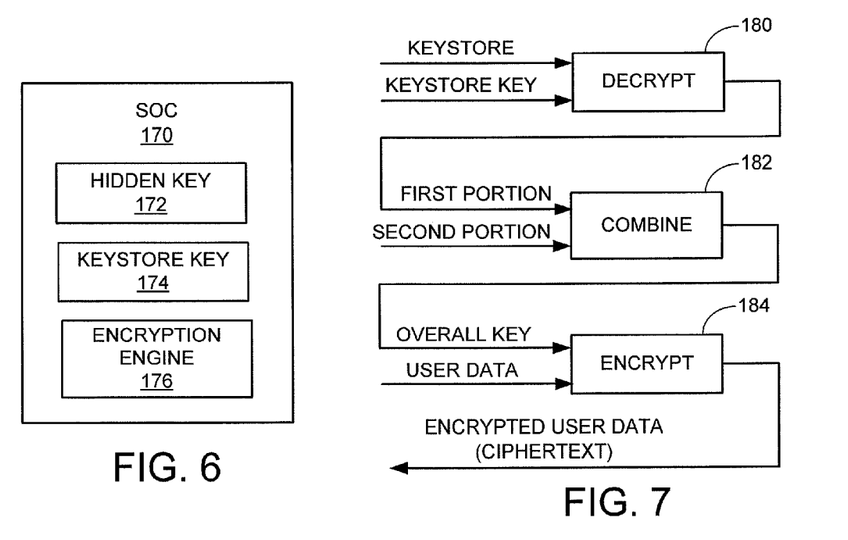
FIG. 6 is a functional block representation of a system on chip (SOC) of another active element of the storage enclosure.
FIG. 7 is a sequence of operations carried out by the respective circuits of FIGS. 5 and 6.

FIG. 6 shows a corresponding SOC device 170 of the storage enclosure 110. The SOC device 170 may correspond to the midplane SOC device 140 or the controller SOC device 142 of FIG. 4, or may be located elsewhere within the storage enclosure. In a manner similar to FIG. 5, the SOC device 170 includes an internal memory location 172 to which is stored the second portion 136 of the cryptographic key 132 (see FIG. 3) as a hidden key. The internal memory location 172 may be formed of one-time programmable (OTP) fusible links, or may take some other form. As with the first portion, the second portion of the secret key can be any suitable length and is generally not accessible in a plaintext format outside the SOC 170.

The SOC 170 may have other internal elements as well, such as a second internal memory 174 which stores a second keystore based on the hidden key (second portion of the overall key) in memory 172, as well as an encryption engine 176 similar to the engine 130 in FIG. 3.

Data access operations (e.g., write and read accesses of data) with the storage device 112 are managed through the cooperative functionality of the respective SOC devices 150, 170 as generally represented in FIG. 7. In some embodiments, the storage device 112 forwards the keystore (in memory 164, FIG. 5) to the SOC device 170 for decryption thereof to retrieve the first portion 134 of the overall key 132. This decoding of the keystore involves the application of a keystore key to a decryption block 180, with the keystore key having been used initially to encrypt the first portion of the overall key to form the keystore. For clarity, in this embodiment the first portion 134 (see FIG. 3) is stored within the keystore, although other arrangements can be used.

It is contemplated that the keystore key is stored by the SOC device 170 in memory 174, although under controlled conditions the keystore key may alternatively or additionally be stored by the storage device 112, such as within the SOC 150. Because of the distributed nature of the encryption system, it is not strictly required that the first portion of the overall key be protected, but information regarding the second portion of the overall key may leak if the plaintext first portion is transmitted to the second device. Accordingly, it is desirable albeit not necessarily required that the first portion be transmitted in an encrypted form.

The keystore key may be generated in a variety of ways such as through the combination of a random sequence and various data values unique to the storage device (e.g., model number, capacity, certain parametric settings determined during device manufacturing, etc.). One or more HMAC or other message digest values may additionally be incorporated into the keystore to detect tampering.

Once the first portion of the overall key is recovered using the decryption block 180, a combining function is carried out by a combine block 182 to combine the first portion and the second portion (e.g., elements 134, 136 in FIG. 3) to form the overall key (e.g., key 132 in FIG. 3). It is contemplated that the second portion 136 is simply concatenated with the first portion 134 in this embodiment. For example, if the secret key 132 is 256 bits in length, the first portion 134 constitutes the first 128 bits (or some other value) of the overall key and the second portion 136 constitutes the last 128 bits (or some other value) of the overall key.

Simple concatenation is not necessarily required; interleaving or other techniques may be applied to combine the first and second keys. Mathematical combinations, such as adding or multiplying the values together, or applying a logical function, such as applying an exclusive-or (XOR) function, may be applied. A third secret value may further be incorporated with the first and second portions to arrive at the overall key.

Regardless, the combine block 182 outputs the overall key which is used by an encryption block 184 to encrypt a set of input user data to form encrypted user data (ciphertext), as shown. The various decrypt, combine and encrypt functions can be carried out internally within the SOC device 170 using the encryption block 176.

The foregoing sequence is carried out during a write operation, so that the result of the sequence is a set of encrypted user data that can thereafter be stored to the storage device in a suitable memory thereof (e.g., rotatable memory 160, etc.). During a read operation, a similar sequence is applied except that the input "user data" are encrypted data retrieved from the storage device, and the block 184 applies the overall key to decrypt the input data to provide the original plaintext user data.

The sequence of FIG. 7 can be described as an "external" encryption process in that the storage device supplies the first portion of the overall key albeit in an encrypted or otherwise wrapped form to the external active element (e.g., the control board 120), and the actual encryption of the data stored on the storage device takes place externally to the storage device. It is contemplated albeit not necessarily required that in such an operation, the storage device can apply additional levels of encryption to the received encrypted data for storage in the storage device memory (e.g., rotatable media 160, etc.).

In an alternative embodiment, the sequence can be reversed so that the encryption takes place at the storage device level. In such case, it is the second portion of the overall key that is protected via a keystore and sent to the storage device upon request, so that the local SOC device 150 carries out the encryption using an "internal" encryption process (e.g., onboard within the storage device 112). An advantage of this internal encryption process is that the encryption/decryption is carried out in parallel by each of the storage devices 112 within the storage enclosure in turn, potentially leading to higher throughput during normal data processing operations.

A variety of ranges of uniqueness levels can be applied to the various overall keys for the individual data storage devices 112 in the system. Strongest protection is provided when each individual data storage device has its own unique overall key. Thus, an attacker who gains knowledge of the overall key for one storage device will generally be unable to leverage this information with regard to discovering the overall key for another storage device from the same storage enclosure 110.

For purposes of operational efficiency, however, a variety of mechanisms can be used to provide unique overall keys while reducing overall complexity. For example, the internally stored first portion (e.g., 134 in FIG. 3) of each overall key may be different for each storage device but the externally stored second portion (e.g., 136 in FIG. 3) may be the same for at least some of the storage devices within the enclosure. In other cases, a unique second portion of the overall key is stored for each storage device and at least some of the storage devices may share the same first portion. A random number generator, entropy extraction module, or other mechanism may be used to generate and/or assign the respective first and second portions for each of the storage devices.

Figure 8:
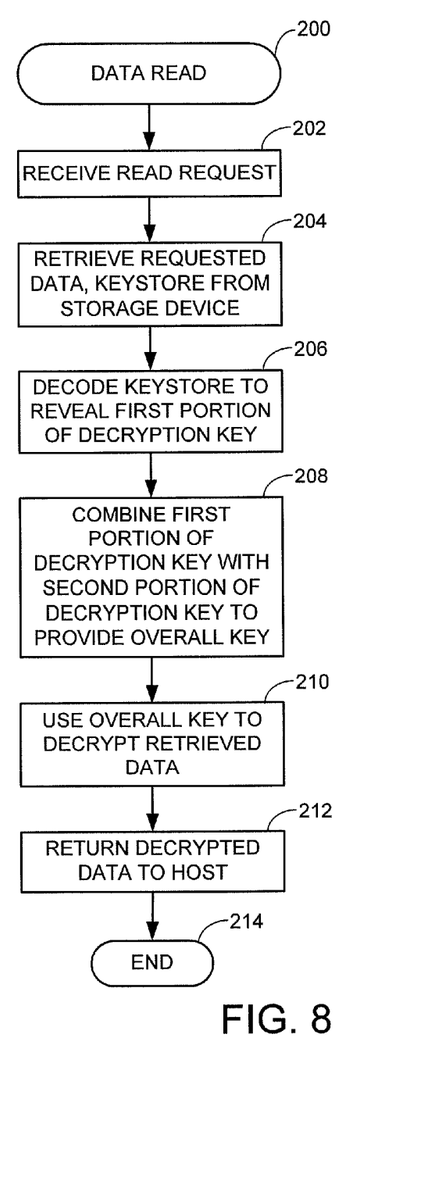
FIG. 8 is a flow chart for a DATA READ routine illustrative of steps carried out in accordance with some embodiments to read data from the storage enclosure.

FIG. 8 shows a DATA READ routine 200 to set forth steps that may be carried out in accordance with various embodiments. For purposes of discussion, FIG. 8 will be contemplated as being carried out for data stored to a selected storage device 112 of the storage enclosure 110 of FIG. 2 using the external encryption sequence of FIG. 7. It will further be contemplated that the second portion of the overall key is stored on the control boards 120 of the storage enclosure.

A read request is initially received at step 202 to retrieve certain data from the storage device 112. The form of the read request will depend on the environment. In a distributed object storage system (e.g., a cloud storage environment, etc.), a request for a particular partition of data may be issued by a proxy server to a local storage server associated with a storage cabinet 108 (FIG. 1). Mapping data may be used to identify the particular storage device 112 on which a copy of the requested data is present, and so an appropriate data request may be forwarded to the storage device for a range of logical blocks (e.g., logical block addresses, LBAs, etc.) associated with the requested partition.

Regardless of the form, upon receipt of the read request the storage device will operate to forward the requested data to the control board 120 of the storage enclosure at step 204. Because the requested data is in encrypted form, the storage enclosure will further forward a copy of the associated keystore in order to transmit, in protected form, the first portion of the overall key required to decrypt the requested data.

The first portion is recovered at step 206 and combined with the second portion at step 208 to provide the overall key, which is used at step 210 to decrypt the retrieved data. The retrieved data is thereafter returned to the requesting host at step 212, and the process ends at step 214.

As noted above, the routine 200 of FIG. 8 is an external encryption routine. The routine can be easily converted to an internal encryption routine by reversing the data input flows so that the storage device receives the second portion of the key and performs internal decryption of the readback data.

Figure 9:
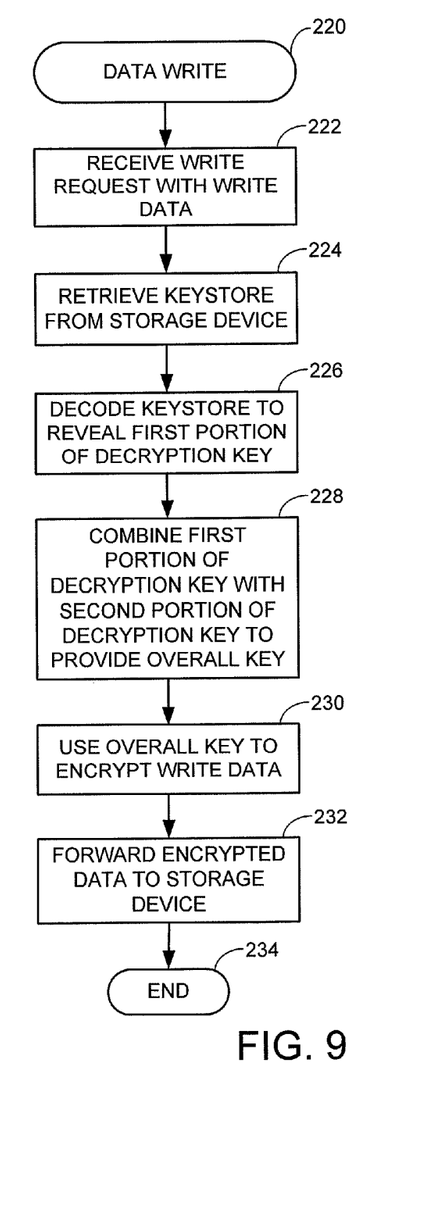
FIG. 9 is a flow chart for a DATA WRITE routine illustrative of steps carried out in accordance with some embodiments to write data to the storage enclosure.

FIG. 9 is a flow chart for a DATA WRITE routine 220 to illustrate steps carried out in accordance with various embodiments to write data to a selected storage device. As before, an external encryption process is illustrated but not necessarily required.

A write request is received at step 222 to write accompanying write data to the storage system. A selected location is identified as corresponding to the selected (target) storage device based on the data storage environment. Once the target storage device is identified, the target storage device forwards the keystore to the control board at step 224. The control board reveals the first portion of the key at step 226, combines this with the second portion of the key to provide the overall key at step 228, and uses the overall key to encrypt the input write data at step 230. The encrypted write data are thereafter forwarded to the target storage device at step 232 for storage thereof, and the process ends at step 234.

It will be noted at this point that the transmission of the keystores (and/or the plaintext portions of the keys) between the storage devices and the other active element (in this case, the control board) in conjunction with each data access operation provides a certain level of additional authentication, since such values are necessary in order to authorize the associated action. As noted above, HMACs or other authentication codes can be transmitted to ensure that a malicious party has not intercepted and changed various codes so that data are placed in an unusable form.

In an alternative embodiment, during storage enclosure initialization each of the keystores (or other input data values) can be transmitted and stored locally by the control board, thereby reducing the requirement for these additional data transmission operations during normal data access activity.

Figure 10:
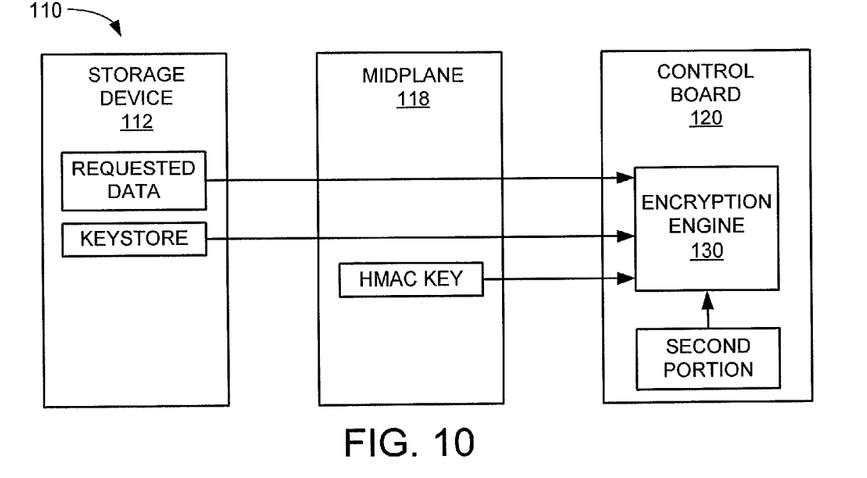
FIG. 10 is a functional block representation of another embodiment in which data inputs are supplied by both a selected storage device and the midplane of the storage enclosure of FIG. 2 to a control board of the storage enclosure.
Figure 11:
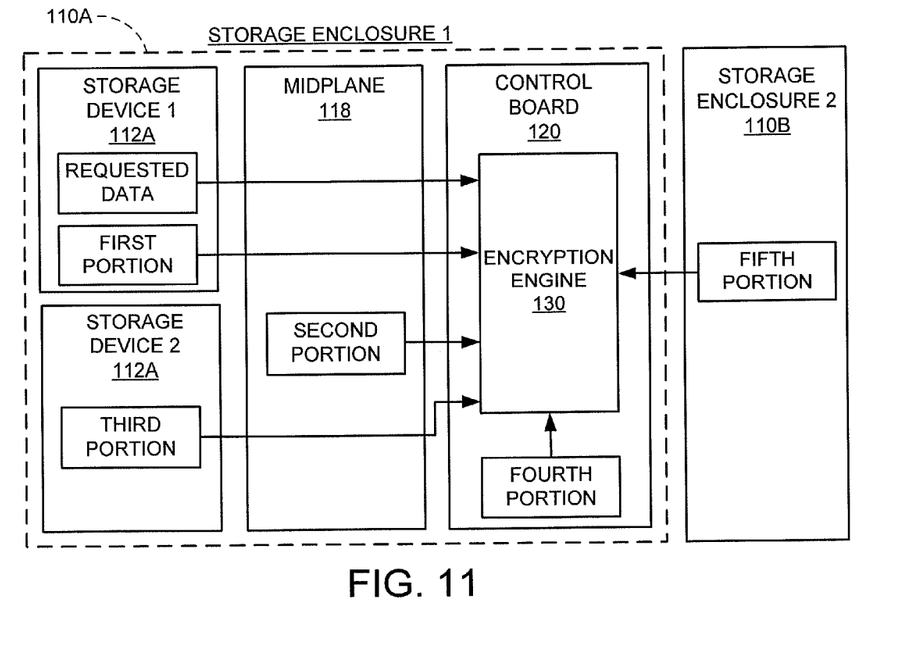
FIG. 11 is a functional block representation of another embodiment in which data inputs are supplied by multiple storage devices and the midplane to the control board of the storage enclosure.

FIGS. 10 and 11 show additional embodiments of the storage enclosure 110 of FIG. 2 that can be implemented in view of the foregoing discussion. In FIG. 10, an encryption engine 130 of the control board 120 performs encryption/decryption processing using a split-key arrangement with a first portion supplied by the storage device 112 and the second portion stored on the control board. However, additional authentication information, such as in the form of an HMAC key, is supplied by a third active element, in this case, the midplane 118. Other information can be supplied by the midplane or other active elements within the storage enclosure 110.

FIG. 11 illustrates another arrangement where the overall key used to decode data from a first storage device 112A within a first enclosure 110A is distributed among various elements within the first enclosure as well as in a different, second storage enclosure 110B. More specifically, the overall key is partitioned into a total of five (5) portions, with the first portion stored on the first storage device 112A, a second portion stored on a different, second storage device 112B, a third portion stored on the midplane 118 in the first enclosure 110A, a fourth portion stored on the control board 120, and a fifth portion stored in the second enclosure 110B. Storing a portion in a different storage enclosure further enhances system security since removal of the first storage enclosure 110A from the rack 108 may still prevent recovery of the data stored on the first storage device 112A.

In one embodiment, the various first through fifth portions are separate encryption keys that are combined in various ways to decrypt the secret key, so that the portions wrap the secret key in a selected way to ensure protection of the secret. In another embodiment, secret sharing techniques are applied so that the first through fifth portions constitute shares of the secret (e.g., secret key). A variety of secret sharing techniques can be used including but not limited to Shamir's Scheme, Blakley's Scheme and the Chinese Remainder Theorem. Other methods can be used so that these are merely examples and are not limiting.

A variety of other arrangements will readily occur to the skilled artisan from a review of FIGS. 10 and 11. In each case, a general overall concept is that the data stored on a particular storage device are generally only decodable so long as the storage device remains physically connected in its native environment. Hence, while remote storage of portions of the keys such as on remote servers can be incorporated as part of the protection scheme, merely storing a portion of the key on a remote server is not by itself a viable solution since the same information would be returned responsive to a request to the remote server independently of the location of the storage device. Similarly, the techniques disclosed herein are not particularly suited to other environments other than a multi-device storage enclosure, since a self-contained storage environment, such as a computer laptop with an internal storage device, would likely be taken all at once and hence, all of the components (even if distributed within the laptop) would likely be accessible by the attacking party.

Different storage devices may distribute the associated key in different ways. For example, with reference again to FIG. 11, the first storage device 112A may utilize key portions stored on a first combination of device locations such as the midplane 118 and the control board 120, and the second storage device 112B may utilize key portions stored on a different, second combination of device locations such as on the first storage device 112A and from a selected location in the second storage enclosure 110B. These locations can be selected in a random fashion and can vary throughout the storage enclosure, thereby making it still harder for an attacking party to evaluate and defeat the security scheme.

In still further embodiments, portions of the key are shared between adjacent or non-adjacent storage devices, so that the "first portion" of the key used to protect data in a first storage device becomes the "second portion" of the key used to protect data in a second storage device, and so on. In this way, available key portions are located throughout the system, and the various key portions are selected and combined in different ways depending on the location of the stored data. A master key table can be maintained in a secret location on the control board 120 or other suitable location to indicate what key portions are used for each storage device.

Upon removal of an active element, a secure erasure operation may take place upon one or more memory locations to securely erase keystores or other values used by the data security system to further enhance system security.

It will be appreciated that protection and division of the keystores can be carried out in numerous ways in view of the present disclosure. For example, key wrapping in which a the first portion comprises a first key and the second portion comprises a second key that encrypts/decrypts the first key, can be used and is encompassed within the foregoing discussion. Alternative key wrapping approaches can be used where appropriate. It will be appreciated that storing different portions of the key in elements that are not likely to be appropriated en mass by an attacking party, such as in the context of a storage enclosure, enhances system security while providing improved flexibility in adapting to different protection requirements of the security system.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A multi-device storage enclosure comprising:
a housing having opposing first and second ends;
a plurality of active elements disposed within the housing comprising an array of data storage devices, a control board, and an interconnection arrangement which mechanically and electrically interconnects the plurality of storage devices with the control board; and
a control circuit disposed within the housing which encrypts user data stored on a selected data storage device using a cryptographic encryption function and an associated cryptographic key, the key partitioned into a plurality of portions with each portion stored in a different one of the active elements.

2. The enclosure of claim 1, wherein the plurality of portions of the key comprise a first portion and a second portion, the first portion stored in a memory located within the selected data storage device.

3. The enclosure of claim 2, wherein the second portion is stored in a memory located within a different, second data storage device of the array.

4. The enclosure of claim 2, wherein the second portion is stored in a memory located within the interconnection arrangement.

5. The enclosure of claim 2, wherein the second portion is stored in a memory located within the control board.

6. The enclosure of claim 1, wherein the control circuit is incorporated into the selected storage device and, responsive to receipt of a data access command to transfer data to or from the selected storage device, the selected storage device receives at least one portion of the key from a midplane of the interconnection arrangement to execute the cryptographic function upon the transfer data associated with the data access command, the midplane disposed in a medial location of the housing between the storage devices and the control circuit.

7. The enclosure of claim 1, wherein the control circuit is incorporated into the control board and, responsive to receipt of a data access command to transfer data to or from the selected storage device, the control board receives at least one portion of the key from the midplane to execute the cryptographic function upon the transfer data associated with the data access command.

8. The enclosure of claim 1, adapted for mounting into a rack with a plurality of additional multi-device storage enclosures nominally identical to the multi-device storage enclosure, wherein the control circuit receives at least one portion of the key from a selected one of the plurality of additional multi-device storage enclosures in the rack.

9. The enclosure of claim 1, wherein at least one portion of the cryptographic key is transferred to the control circuit from at least one the active elements responsive to receipt of a data access command associated with the selected data storage device, the at least one portion encrypted in the form of a keystore prior to said transfer using a second cryptographic function and a keystore key, the control circuit further configured to apply the second cryptographic function and the keystore key to reveal the transferred at least one portion.

10. The enclosure of claim 1, wherein the control circuit comprises a system on chip (SOC) device with an internal memory which stores a first portion of the cryptographic key and combines said first portion with a second portion of the cryptographic key transferred to the control circuit by way of the midplane to recover the overall cryptographic key.

11. The enclosure of claim 1, wherein a first portion of the cryptographic key is stored in the selected data storage device, a second portion of the cryptographic key is stored in the control board, and a third portion of the cryptographic key is stored in a remaining one of the active elements.

12. The enclosure of claim 1, wherein the control circuit uses an authentication code in the form of a keyed message digest value to authenticate receipt of at least one of the portions of the cryptographic key.

13. The enclosure of claim 1, wherein each of the plurality of portions is an authentication key that wraps the encryption key, and each of the authentication keys are required to decrypt to encryption key.

14. The enclosure of claim 1, wherein the plurality of portions comprise shares in an (N, M) secret sharing scheme enacted by the control circuit in which the cryptographic key is protected by a plural number N shares, wherein at least a plural number M shares are required to reconstitute the secret key and M−1 shares are insufficient to do so, and wherein N≤M.

15. A computer-implemented method for data security, the method comprising:
   providing a multi-device storage enclosure having a housing with opposing first and second ends and a plurality of active elements disposed within the housing comprising an array of data storage devices, a control board, and an interconnection assembly which mechanically and electrically interconnects the plurality of storage devices with the control board;
   applying a cryptographic encryption function using an associated cryptographic key to encrypt user data stored on a selected data storage device of the array;
   partitioning the cryptographic key into a plurality of portions; and
   storing each portion in a different one of the active elements, wherein at least one of the plurality of portions is stored in a selected data storage device of the array of data storage devices.

16. The method of claim 15, wherein the storing step comprises storing a first portion in a memory located within the selected data storage device and a second portion in a non-volatile memory incorporated into a selected one of the control board and the interconnection assembly.

17. The method of claim 15, further comprising encrypting the transferred first portion using a second cryptographic function and a keystore key to form an encrypted keystore, wherein the transferred first portion is in the form of said encrypted keystore.

18. The method of claim 13, further comprising mounting the multi-device data storage enclosure into a rack with a plurality of additional multi-device storage enclosures nominally identical to the multi-device storage enclosure, wherein a selected portion of the cryptographic key is stored in and transferred from a selected one of the plurality of additional multi-device storage enclosures in the rack responsive to receipt of a data access command with the selected data storage device.

19. A computer-implemented method for data security, comprising:
   receiving a data transfer command to transfer data between a data storage device and a host, the data storage device located in a multi-device data storage enclosure comprising an array of said data storage devices connected to a midplane and a control board which communicates with the array of data storage devices through said midplane;
   assembling a cryptographic key using a plurality of portions thereof stored in different memory locations within the multi-device data storage enclosure, wherein at least a first portion is stored in the array of said data storage devices and at least a second portion is stored in the control board; and
   applying a cryptographic function to the transfer data using the assembled cryptographic key.

20. The method of claim 19, wherein the cryptographic key is further assembled responsive to receipt of a third portion stored in a memory device of the midplane.

\* \* \* \* \*